United States Patent
Zhang et al.

(10) Patent No.: US 12,056,950 B2
(45) Date of Patent: Aug. 6, 2024

(54) TRANSFORMER-BASED MULTI-SCALE PEDESTRIAN RE-IDENTIFICATION METHOD

(71) Applicant: Hangzhou Dianzi University, Hangzhou (CN)

(72) Inventors: Min Zhang, Hangzhou (CN); Lingjie He, Hangzhou (CN); Ming Jiang, Hangzhou (CN)

(73) Assignee: Hangzhou Dianzi University, Hangzhou (CN)

( * ) Notice: Subject to any disclaimer, the term of this patent is extended or adjusted under 35 U.S.C. 154(b) by 0 days.

(21) Appl. No.: 18/493,635

(22) Filed: Oct. 24, 2023

(65) Prior Publication Data

US 2024/0161531 A1  May 16, 2024

(30) Foreign Application Priority Data

Nov. 10, 2022  (CN) .......................... 202211404764.8

(51) Int. Cl.
*G06V 40/10* (2022.01)
*G06V 10/26* (2022.01)
(Continued)

(52) U.S. Cl.
CPC .............. *G06V 40/10* (2022.01); *G06V 10/26* (2022.01); *G06V 10/806* (2022.01); *G06V 10/82* (2022.01);
(Continued)

(58) Field of Classification Search
CPC ...... G06V 10/26; G06V 10/806; G06V 10/82; G06V 40/10; G06V 20/52; G06V 20/53;
(Continued)

(56) References Cited

U.S. PATENT DOCUMENTS

| | | | |
|---|---|---|---|
| 2020/0226421 A1 | 7/2020 | Almazan et al. | |
| 2022/0012848 A1 | 1/2022 | Ranftl et al. | |
| 2022/0292394 A1* | 9/2022 | Huang | ................... G06N 3/045 |

FOREIGN PATENT DOCUMENTS

| | | | | |
|---|---|---|---|---|
| CN | 114092964 | * | 2/2022 | ......... G06F 18/2321 |
| CN | 114202740 A | | 3/2022 | |
| CN | 114973317 A | | 8/2022 | |
| CN | 115063833 A | | 9/2022 | |
| CN | 115147284 A | | 10/2022 | |

OTHER PUBLICATIONS

Qian et al., "Leader-Based Multi-Scale Attention Deep Architecture for Person Re-Identification", Feb. 2020, IEEE, IEEE Transactions on Pattern Analysis and Machine Intelligence, vol. 42, No. 2, p. 371-385. (Year: 2020).*

(Continued)

*Primary Examiner* — Vincent Rudolph
*Assistant Examiner* — Timothy Choi

(57) ABSTRACT

The invention discloses a Transformer-based multi-scale pedestrian re-identification method. The present invention proposes a pedestrian re-identification network based on multi-scale pedestrian feature extraction and Transformer. Firstly, we designed a multi-scale feature cascade module, which aims to mine detailed feature information of pedestrians at different depths and scales, so as to obtain stronger feature representation. Secondly, we constructed a feature extraction based on Transformer to learn pedestrian features at a global scale. Finally, the features output by the Transformer are aggregated to obtain a better expression of pedestrian features, thereby improving the discrimination ability of the model. The result shows that this method has better robustness and adaptive ability, and effectively enhances the generalization ability of the model.

4 Claims, 6 Drawing Sheets

(51) Int. Cl.
　　*G06V 10/80*　　(2022.01)
　　*G06V 10/82*　　(2022.01)
　　*G06V 20/52*　　(2022.01)
(52) U.S. Cl.
　　CPC .... *G06V 20/52* (2022.01); *G06T 2207/20084* (2013.01); *G06T 2207/30196* (2013.01); *G06T 2207/30232* (2013.01)
(58) Field of Classification Search
　　CPC ............ G06V 20/58; G06N 3/02; G06N 3/04; G06N 3/045; G06N 3/0455; G06T 2207/20084; G06T 2207/30196; G06T 2207/30232
　　See application file for complete search history.

(56) References Cited

OTHER PUBLICATIONS

Luo et al., "STNReID: Deep Convolutional Networks With Pairwise Spatial Transformer Networks for Partial Person Re-Identification", Nov. 2020, IEEE, IEEE Transactions on Multimedia, vol. 22, No. 11, p. 2905-2913. (Year: 2020).*

Yan et al., "Beyond Triplet Loss: Person Re-Identification With Fine-Grained Difference-Aware Pairwise Loss", Mar. 2021, IEEE, IEEE Transactions on Multimedia, vol. 24, p. 1665-1677. (Year: 2021).*

He et al., "TransReID: Transformer-based Object Re-Identification", Oct. 2021, IEEE, 2021 IEEE/CVF International Conference on Computer Vision, p. 14993-15002. (Year: 2021).*

Chen et al., "CrossViT: Cross-Attention Multi-Scale Vision Transformer for Image Classification", Oct. 2021, IEEE, 2021 IEEE/CVF International Conference on Computer Vision, p. 347-356. (Year: 2021).*

Zhang et al., "HAT: Hierarchical Aggregation Transformers for Person Re-identification", Oct. 2021, ACM, MM '21: Proceedings of the 29th ACM International Conference on Multimedia, p. 516-525 (Year: 2021).*

Dosovitskiy et al., "An Image is Worth 16x16 Words:Transformers for Image Recognition at Scale", Jun. 2021, arXiv.org, <https://arxiv.org/abs/2010.11929>, p. 1-22. (Year: 2021).*

Wang XIao et al., "Pedestrian re-recognition method based on TransReID", Practical Electronics, vol. 432, No. 22, Nov. 30, 2021, pp. 57-59.

Shuting He et al., "TransReID Transformer-based Object Re-Identification", arXiv, Mar. 26, 2021, pp. 1-13.

* cited by examiner

TRANSFORMER-BASED MULTI-SCALE PEDESTRIAN RE-IDENTIFICATION METHOD

CROSS-REFERENCE TO RELATED APPLICATIONS

This application claims the priority of Chinese Patent Application No. 202211404764.8, filed on Nov. 10, 2022, which is hereby incorporated by reference in its entirety.

TECHNICAL FIELD

The present disclosure relates to pedestrian re-identification technology, specifically a Transformer-based multi-scale pedestrian re-identification method, which belongs to the field of computer vision.

BACKGROUND

Pedestrian re-identification aims to correlate pedestrian images captured by different cameras to realize cross-camera and cross-scenario pedestrian recognition and retrieval, which is widely used in the field of intelligent monitoring. In recent years, the pedestrian re-identification method based on the deep convolutional network has achieved excellent results, but CNN is limited by the fact that it can only process adjacent features each time and it is easy to lose the fine-grained features of pedestrians in the process of downsampling, resulting in a decline recognition rate. Meanwhile, the Transformer has shown excellent modeling capabilities for both spatial and sequential data. Compared to CNN, the Transformer eliminates downsampling operations, allowing for the preservation of more fine-grained features.

Most Transformer-based pedestrian re-identification methods typically segment the entire image into image sequences and feed them into the Transformer network, and then use the global token to represent the pedestrian features. However, directly segmenting the image ignores some structural information and slows down the convergence speed of the Transformer network. Dividing a single-scale pedestrian feature into a sequence of features as input to the Transformer network disregards the multi-scale representation of pedestrian features. In the network output, the rich local pedestrian features are still not fully utilized, yet these features provide crucial fine-grained information for pedestrian re-identification.

Based on the above, the present invention proposes a Transformer-based multi-scale pedestrian re-identification method, which utilizes rich information contained in image features of multiple scales to optimize the feature extraction of pedestrian images.

SUMMARY

The purpose of the present invention is to address the shortcomings of existing techniques by proposing a multi-scale pedestrian re-identification method based on Transformer. By constructing a feature cascading module, while retaining the low-dimensional detailed features of pedestrians, the support of high-dimensional features is introduced, and pedestrian features of multiple scales are obtained, which alleviates the requirements of the Transformer network for large training data sets, and can help the model quickly converge and improve performance. At the same time, this method divides the pedestrian features of multiple scales to construct a multi-scale feature sequence and inputs it into the same Transformer network after adding coding information representing different scales, so as to guide the model to pay attention to the pedestrian information at different scales. Furthermore, the local feature multi-scale fusion module is constructed to make full use of the multi-scale pedestrian fine-grained local features output from the network to construct a multi-scale feature set for each pedestrian, which guides the model to mine more robust pedestrian feature representations from local to global and shallow to deep.

The technical solutions adopted by the present invention to solve its technical problems are as follows:

Step (1): Introduce the feature cascading branch in the residual network ResNet50, and perform feature fusion on the feature maps of different scales in adjacent layers.

Step (2): Segment the feature maps of different scales fused in step (1), and then add a learnable [SCALE_TOKEN] to each segmented feature group to represent different scales. Flatten the subgraphs divided by different scales, and add [POS_TOKEN] representing the position and the global feature [CLS_TOKEN] as the input of the transformer.

Step (3): Construct a pedestrian feature extraction network based on standard Transformer, and input the feature subgraph vector obtained in step 2 into the network to obtain pedestrian features.

Step (4): Construct the local feature multi-scale fusion module, slice the features obtained in step (3), take the [CLS_TOKEN] vector as the global feature, and at the same time input the local features with different scales into the local feature multi-scale fusion module and re-slice them to obtain the final features.

Step (5): Use the [CLS_TOKEN] vector and the multi-scale fusion vector obtained in step (4) to train according to the training strategy to obtain the final ReID model.

Further, the specific implementation process of the step (1) is as follows:

Step 1-1: Utilize ResNet50 pre-trained on ImageNet as the backbone network, retain the first pooling stage and the first three stages of the backbone network, while removing the final stage, spatial down-sampling operations, global average pooling layer, and fully connected layer.

Step 1-2: Obtain the feature information of a total of 4 stages retained in step 1-1 from ResNet50, and construct a multi-scale feature cascade module, and obtain pedestrian feature information through pairwise fusion between adjacent layers. First, upsample and perform 1×1 convolution on the features obtained from Stage 1, increasing the size of the feature maps to twice their original size. Then, perform feature fusion between the features from Stage 1 and Stage 2, Stage 2 and Stage 3, and Stage 3 and Stage 4. As shown in formula (1) (2):

$$F_{sc} = \text{Contact}(\text{UpSample}(F_s), F_b) \quad (1)$$

$$F_{agg} = \text{conv}_{1\times 1}(F_{sc}) \quad (2)$$

$F_s$, $F_b$ respectively represent two features that need to be fused, UpSample represents the upsampling operation, Contact is the vector connection operation, $F_{agg}$ the obtained fusion feature.

Further, the specific implementation process of the step (2) is as follows:

Step 2-1: For the obtained fusion feature $F_{agg}$, divide it according to the sub-feature map size ps,generate a feature map sequence $x_p = \{F_{agg}{}^i | i=1,2,\ldots N\}$, N the number of splits, and then add a learnable [SCALE_TOKEN] to $x_p$. [SCALE TOKEN] has the same dimension size as $x_p$, as shown in formula (3):

$$x_p{}^k = x_p + E_{scale} \qquad (3)$$

$x_p{}^k$ is the sequence of feature maps generated at the k scale; $E_{scale}$ is [SCALE_TOKEN], indicating the learnable feature scale.

In summary, add [CLS_TOKEN] and [POS_TOKEN] to the feature processing of the three scales obtained in step 1-2 to obtain feature Z, as shown in formula (4):

$$Z = [x_{cls}; x_p{}^1; x_p{}^2; x_p{}^3] + E_{pos} \qquad (4)$$

$x_{cls}$ is the global feature vector of [CLS_TOKEN]; $x_p{}^1$, $x_p{}^2$, and $x_p{}^3$ are feature sequences of three scales respectively; E pos is [POS_TOKEN], indicating the spatial position.

Further, the specific implementation process of the step (3) is as follows:

Step 3-1: In order to fully utilize the multi-scale information, construct a multi-scale feature extraction model for pedestrians based on Transformer. The model is mainly composed of multi-layer stacked Transformer blocks. A single Transformer layer is composed of multi-head attention mechanism MSA, layer normalization LN and multi-layer perceptron MLP. A single Transformer block can be formulated as (5) (6):

$$Z'_l = MSA(LN(Z_{l-1})) + Z_{l-1}\, l=1\ldots L \qquad (5)$$

$$Z_l = MLP(LN(Z'_l)) + Z'_l\, l=1\ldots L \qquad (6)$$

$Z_l$ represents the output feature of the l-th layer Transformer block, $Z'_l$ is the intermediate result in the Transformer block, and L is the total number of layers. For the multi-scale feature Z generated by each image, as the input of the Transformer network, the network output result is the output feature of the last layer.

Further, the specific implementation process of the step (4) is as follows:

Step 4-1: After obtaining the output feature $Z_L$ of the Transformer model, divide the feature $Z_L$ to obtain four sets of feature vectors, that is, the global feature $f_{cls}$ and three features $f_{scale\_1}$, $f_{scale\_2}$ and $f_{scale\_3}$ of different scales; the features of different scales are double Linear interpolation, and then perform feature fusion through 1*1 convolution to obtain the final local feature $f_{final}$, then, according to the pedestrian structure, $f_{final}$ can be divided into four local features $f_1$, $f_2$, $f_3$, $f_4$.

Further, the specific implementation process of the step (5) is as follows:

Step 5-1: Use the labeled data in the pedestrian re-identification dataset as supervision information, and use ID loss and difficult triplet loss to train the network for each training batch; ID loss uses cross-entropy loss to train the network, and the formula is as follows:

$$L_{id} = \Sigma_{i=1}{}^N - q_i \log(p_i) \qquad (7)$$

N is the number of pedestrian categories, $q_i$ is the supervised label, and $p_i$ is the predicted label.

Difficult triplet loss randomly samples P identities, and extracts K instances from each share to form a mini batch of size P*K; selects each picture $x_a$ in the batch as an anchor point in turn, and selects the farthest positive sample picture $x_p$ and the nearest negative sample picture $x_n$ in the batch to form a triplet to train the network and enhance the generalization ability of the network. The formula is:

$$L_{triplet} = \qquad (8)$$
$$\sum_{i=1}^{P} \sum_{a=1}^{K} \left[ m + \underbrace{\max_{1 \leq p \leq K} \|f(x_{i,a}) - f(x_{i,p})\|_2}_{\text{hardest positive}} - \underbrace{\min_{\substack{n=1\ldots K \\ j=1\ldots P, j \neq i}} \|f(x_{i,a}) - f(x_{j,n})\|_2}_{\text{hardest negative}} \right]_+$$

Step 5-2: According to the features extracted in step (4), the overall loss function of the ReID model uses the global features and local features to calculate $L_{id}$ and $L_{triplet}$ to train the network, which can be formulated as follows:

$$\text{Loss} = L_{id}(f_{cls}) + L_{triplet}(f_{cls}) + \frac{1}{k} \sum_{i=1}^{k} (L_{id}(f_i) + L_{triplet}(f_i)) \qquad (9)$$

k represents the number of output feature groups.

Step 5-3: When the model is stable, get the final ReID model, input the image to be queried and the test set image into the final ReID model for feature extraction, compare whether the features of the query image and the test set image belong to the same category, and output pedestrian images of the same type.

The beneficial effects of the present invention are as follows:

The present invention introduces a Transformer-based multi-scale pedestrian re-identification method. By utilizing a ResNet feature concatenation module, the method collects pedestrian features at different scales, ensuring that low-dimensional fine-grained details are preserved while incorporating high-dimensional semantic features. This enables the model to learn more robust pedestrian representations. Moreover, the multi-scale information guides the model to pay attention to pedestrian features at different scales. The model explores pedestrian latent information from global to local perspectives and from shallow to deep layers. Furthermore, to fully leverage the fine-grained local features of pedestrians, the present invention incorporates a local feature multi-scale fusion module. This module integrates and splits the information from different scales provided by the network output, allowing the model to focus on the feature information of different parts and scales of the pedestrian. The results demonstrate that this approach extracts features with enhanced robustness, effectively improving the model's generalization ability.

BRIEF DESCRIPTION OF DRAWINGS

In order to illustrate the technical solutions of the embodiments of the present application more clearly, the following briefly introduces the accompanying drawings that need to be used in the description of the embodiments of the present application. Obviously, the drawings in the following description are only some embodiments of the present application. For those of ordinary skill in the art, other drawings can also be obtained from these drawings without creative effort.

DETAILED DESCRIPTIONS

The present invention will be further described below in conjunction with the accompanying drawings.

Figure 1:
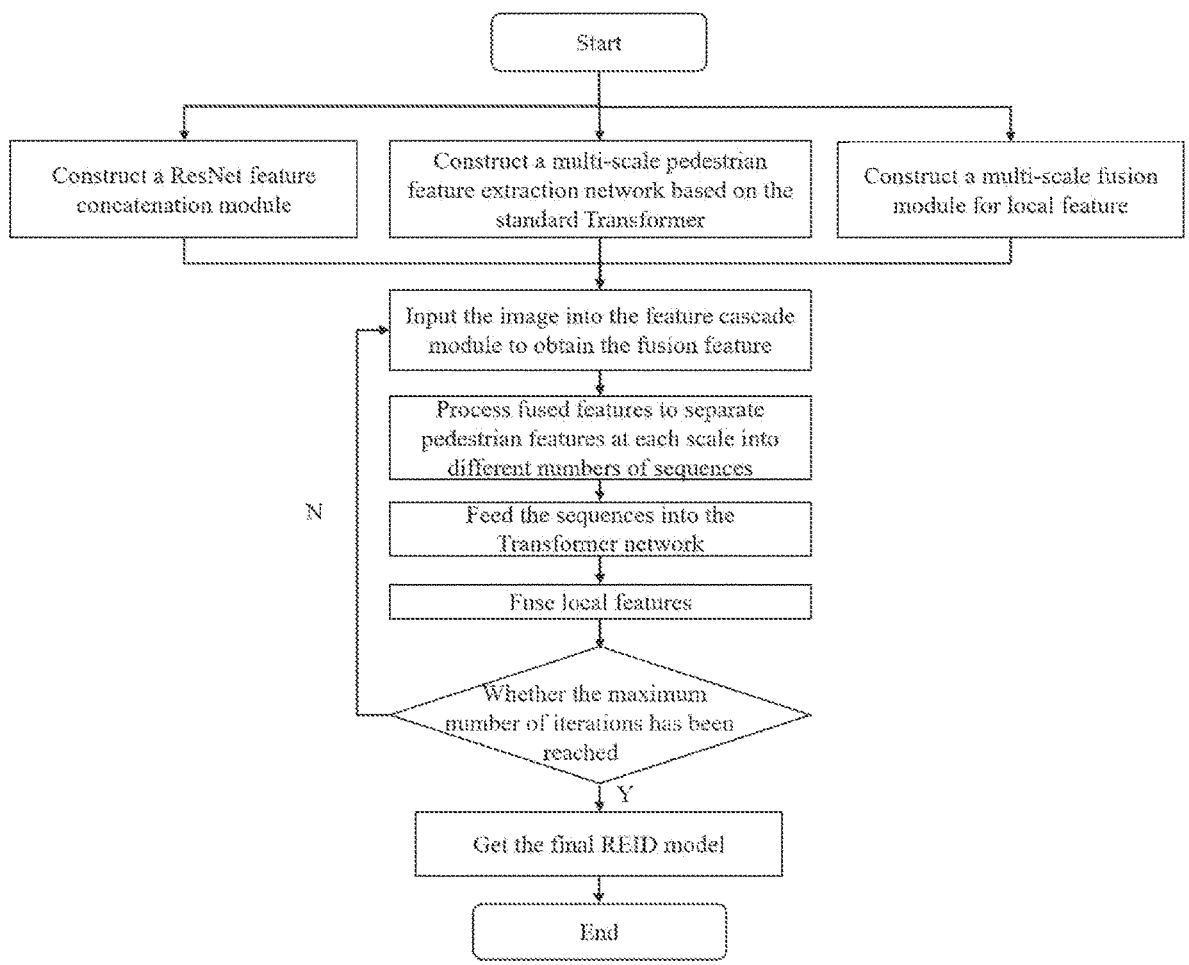
FIG. 1 represents the overall implementation process flowchart of the present invention.
Figure 2:
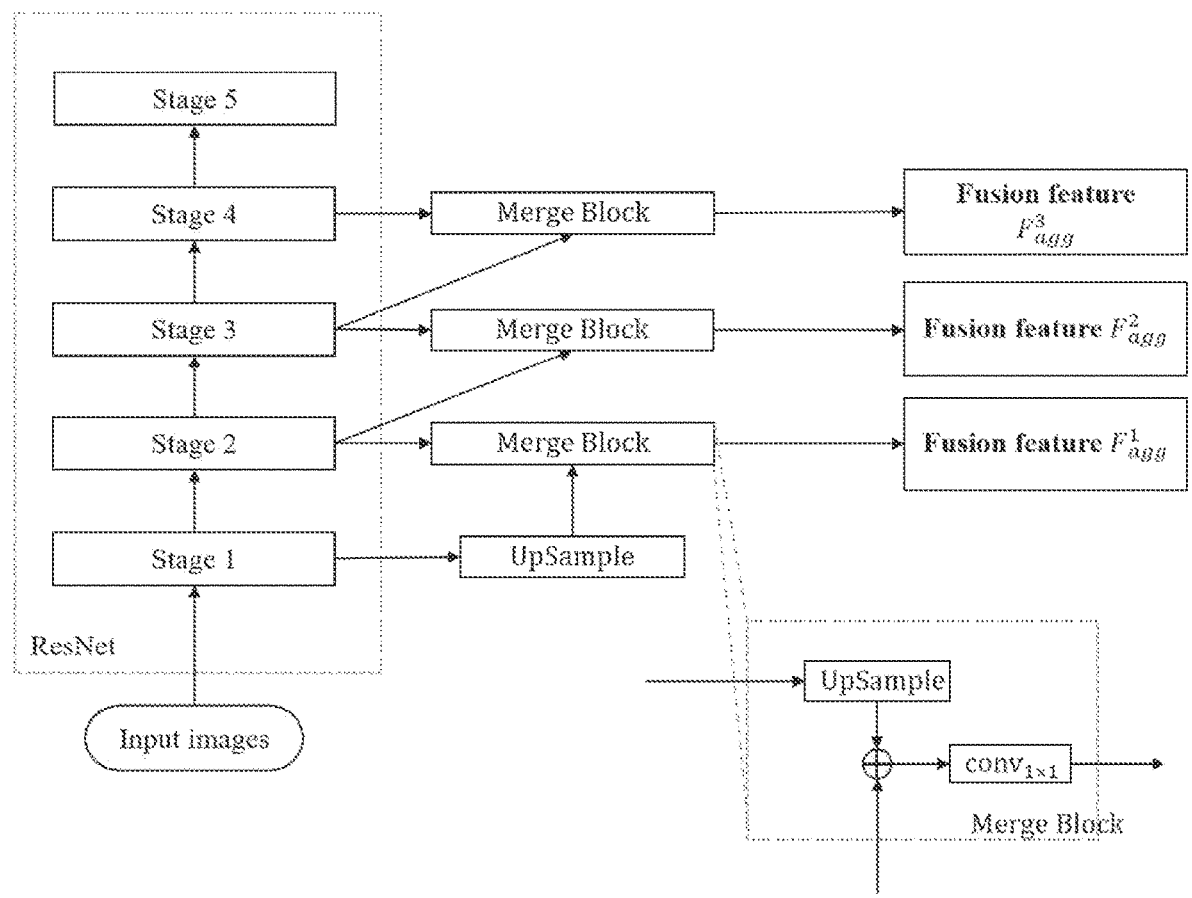
FIG. 2 illustrates the schematic diagram of the ResNet50 feature concatenation module in the present invention.
Figure 6:
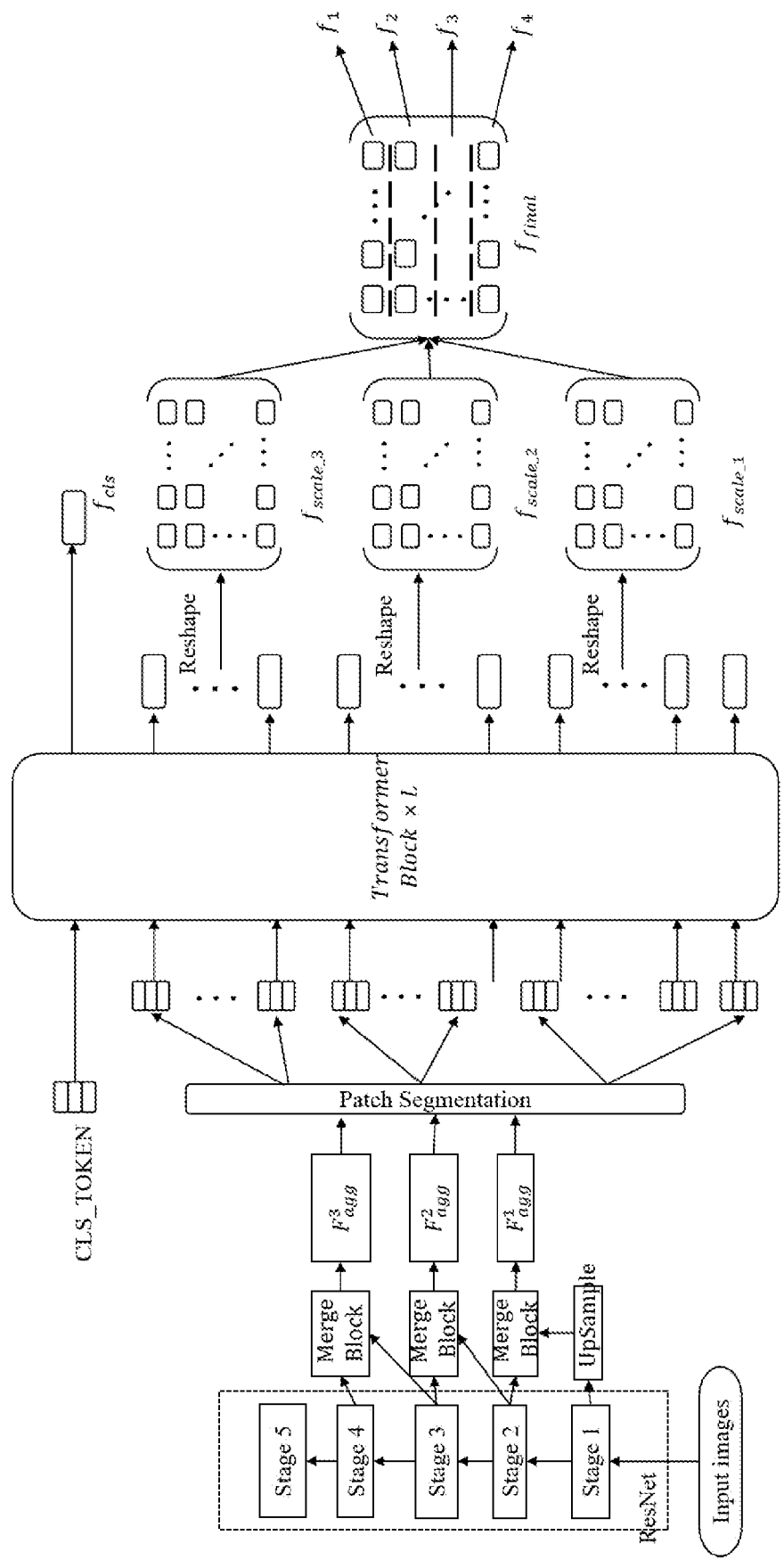
FIG. 6 showing the overall structural diagram of the present invention.

Referring to FIG. 1, which illustrates the overall implementation process flowchart of the present invention, the invention involves constructing a feature concatenation module based on ResNet to extract features from images at different scales and perform pairwise concatenation. This process allows for the preservation of fine-grained details while incorporating support from higher-level features. Additionally, the [SCALE_TOKEN] is introduced to each patch, indicating the scale of the feature information within the transformer network. In addition, by fully leveraging the multi-scale local features of the network, the present invention explores the latent information between pedestrians across different parts and scales, effectively enhancing the model's generalization ability. As shown in FIG. 6, the present invention comprises the following steps:

Step (1): As shown in FIG. 2, introduce the feature cascading branch in the residual network ResNet50, and perform feature fusion on the feature maps of different scales in adjacent layers.

Figure 3:
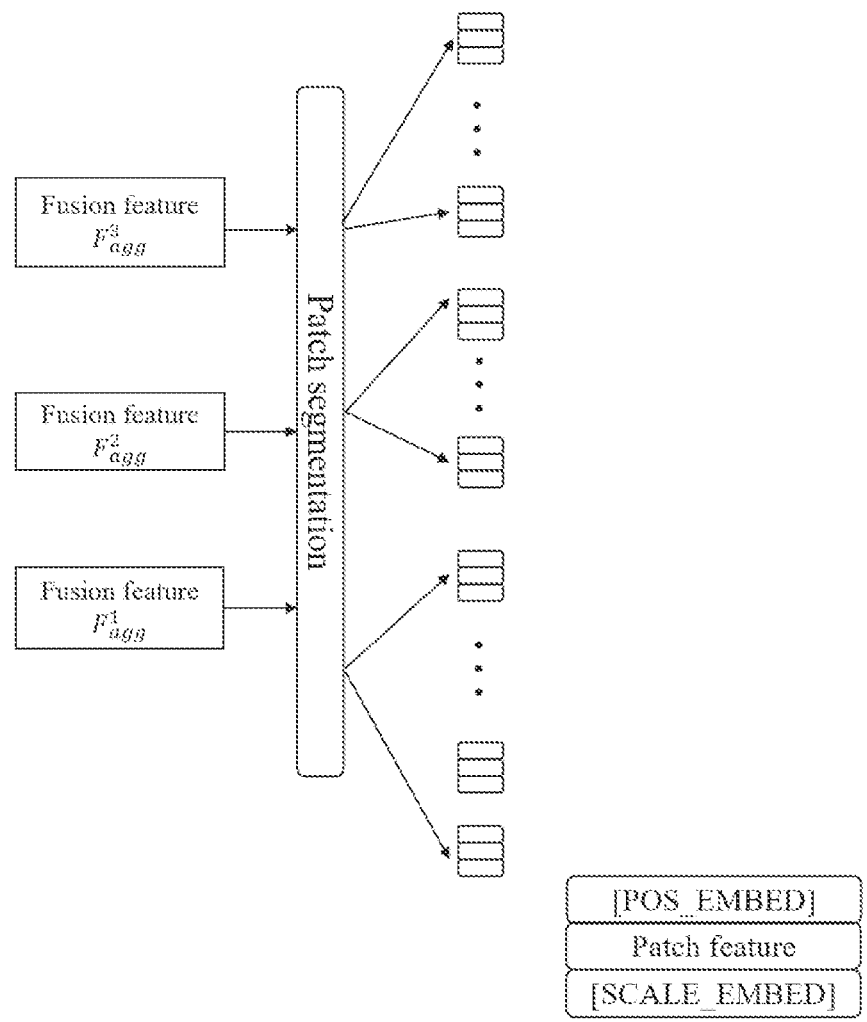
FIG. 3 depicts the schematic diagram of the feature segmentation process in the present invention.

Step (2): As shown in FIG. 3, segment the feature maps of different scales fused in step (1), and then add a learnable [SCALE_TOKEN] to each segmented feature group to represent different scales. Flatten the subgraphs divided by different scales, and add [POS_TOKEN] representing the position and the global feature [CLS_TOKEN] as the input of the transformer.

Figure 4:
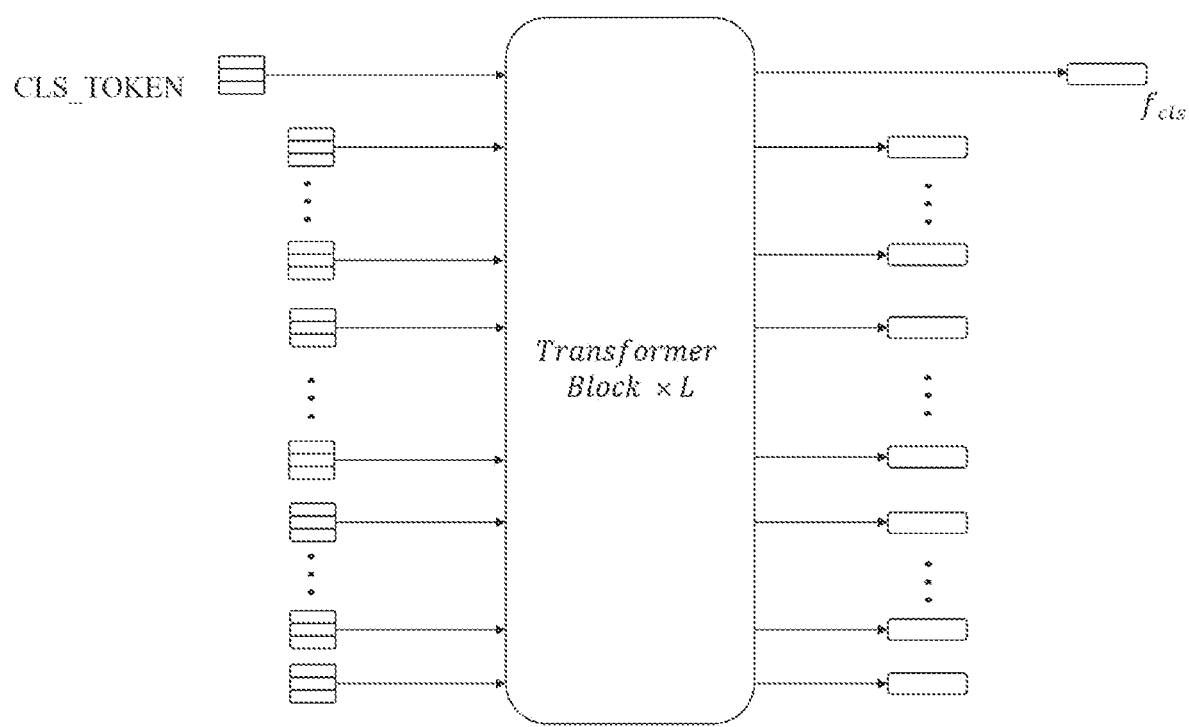
FIG. 4 illustrates the schematic diagram of the Transformer network in the present invention.

Step (3): As shown in FIG. 4, construct a pedestrian feature extraction network based on standard Transformer, and input the feature subgraph vector obtained in step 2 into the network to obtain pedestrian features.

Figure 5:
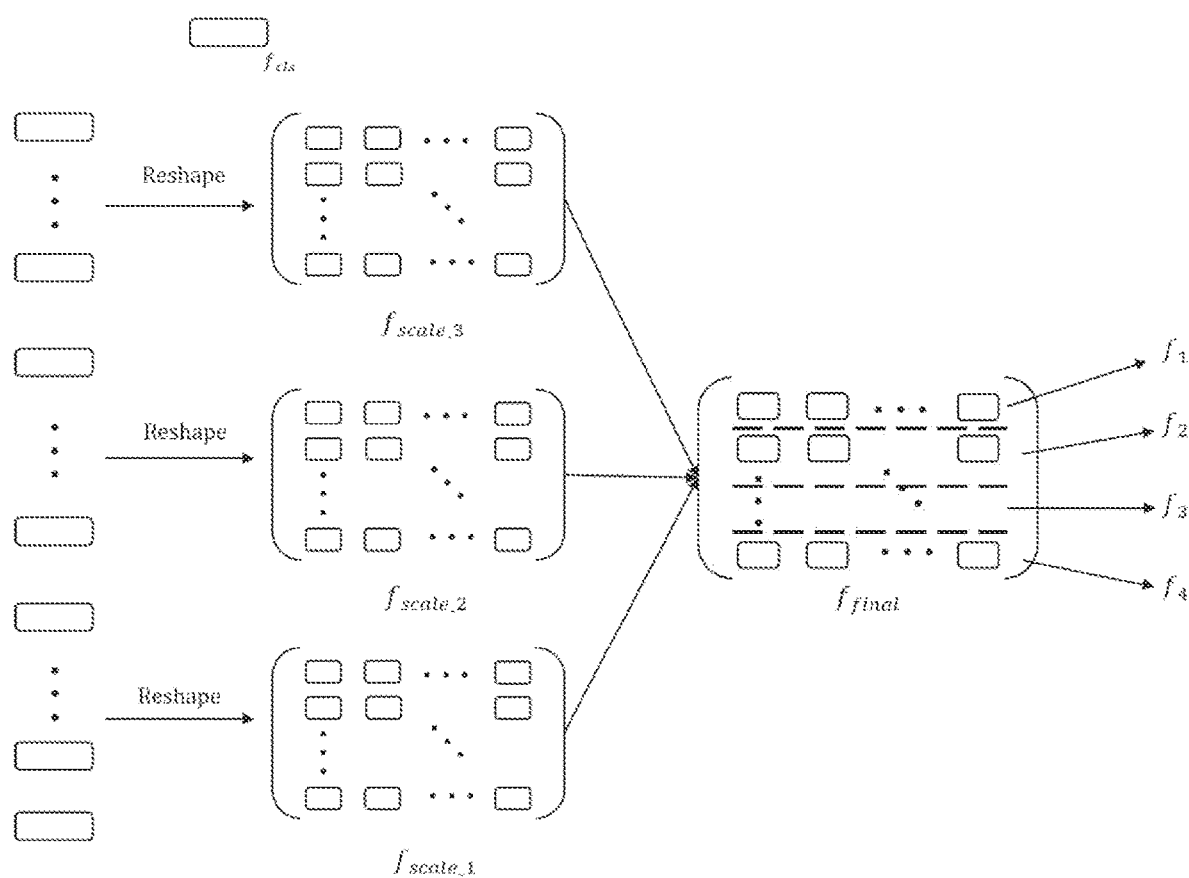
FIG. 5 presents the schematic diagram of the multi-scale local feature fusion module in the present invention.

Step (4): As shown in FIG. 5, construct the local feature multi-scale fusion module, slice the features obtained in step (3), take the [CLS_TOKEN] vector as the global feature, and at the same time input the local features with different scales into the local feature multi-scale fusion module and re-slice them to obtain the final features.

Step (5): Use the [CLS_TOKEN] vector and the multi-scale fusion vector obtained in step (4) to train according to the training strategy to obtain the final ReID model.

Further, the specific implementation process of the step (1) is as follows:

Step 1-1: Utilize ResNet50 pre-trained on ImageNet as the backbone network, retain the first pooling stage and the first three stages of the backbone network, while removing the final stage, spatial down-sampling operations, global average pooling layer, and fully connected layer.

Step 1-2: Obtain the feature information of a total of 4 stages retained in step 1-1 from ResNet50, and construct a multi-scale feature cascade module, and obtain pedestrian feature information through pairwise fusion between adjacent layers. First, upsample and perform 1×1 convolution on the features obtained from Stage 1, increasing the size of the feature maps to twice their original size. Then, perform feature fusion between the features from Stage 1 and Stage 2, Stage 2 and Stage 3, and Stage 3 and Stage 4. As shown in formula (1) (2):

$$F_{sc}=\text{Contact}(\text{UpSample}(F_s),F_b) \quad (1)$$

$$F_{agg}=\text{conv}_{1\times 1}(F_{sc}) \quad (2)$$

$F_s$, $F_b$ respectively represent two features that need to be fused, UpSample represents the upsampling operation, Contact is the vector connection operation, $F_{agg}$ is the obtained fusion feature.

Further, the specific implementation process of the step (2) is as follows:

Step 2-1: For the obtained fusion feature $F_{agg}$, divide it according to the sub-feature map size ps, generate a feature map sequence $x_p=\{f_{agg}^i|i=1,2,\ldots N\}$ is the number of splits, and then add a learnable [SCALE_TOKEN] to $x_p$. [SCALE TOKEN] has the same dimension size as $x_p$, as shown in formula (3):

$$x_p^k=x_p+E_{scale} \quad (3)$$

$x_p^k$ is the sequence of feature maps generated at the k-th scale; $E_{scale}$ is [SCALE_TOKEN], indicating the learnable feature scale.

In summary, add [CLS_TOKEN] and [POS_TOKEN] to the feature processing of the three scales obtained in step 1-2 to obtain feature Z, as shown in formula (4):

$$Z=[x_{cls};x_p^1;x_p^2;x_p^3]+E_{pos} \quad (4)$$

$x_{cls}$ is the global feature vector of [CLS_TOKEN]; $x_p^1$, $x_p^2$, and $x_p^3$ are feature sequences of three scales respectively; $E_{pos}$ is [POS_TOKEN], indicating the spatial position.

Further, the specific implementation process of the step (3) is as follows:

Step 3-1: In order to fully utilize the multi-scale information, construct a multi-scale feature extraction model for pedestrians based on Transformer. The model is mainly composed of multi-layer stacked Transformer blocks. A single Transformer layer is composed of multi-head attention mechanism MSA, layer normalization LN and multi-layer perceptron MLP. A single Transformer block can be formulated as (5) (6):

$$Z'_l=MSA(LN(Z_{l-1}))+Z_{l-1} \quad l=1\ldots L \quad (5)$$

$$Z_l=MLP(LN(Z'_l))+Z'_l \quad l=1\ldots L \quad (6)$$

$Z_l$ represents the output feature of the l-th layer Transformer block, $Z'_l$ is the intermediate result in the Transformer block, and L is the total number of layers. For the multi-scale feature Z generated by each image, as the input of the Transformer network, the network output result is the output feature of the last layer.

Further, the specific implementation process of the step (4) is as follows:

Step 4-1: After obtaining the output feature $Z_L$ of the Transformer model, divide the feature $Z_L$ to obtain four sets of feature vectors, that is, the global feature $f_{cls}$ and three features $f_{scale\_1}$, $f_{scale\_2}$ and $f_{scale\_3}$ of different scales; the features of different scales are double Linear interpolation, and then perform feature fusion through 1*1 convolution to obtain the final local feature $f_{final}$;

then, according to the pedestrian structure, $f_{final}$ can be divided into four local features $f_1$, $f_2$, $f_3$, $f_4$.

Further, the specific implementation process of the step (5) is as follows:

Step 5-1: Use the labeled data in the pedestrian re-identification dataset as supervision information, and use ID loss and difficult triplet loss to train the network for each training batch; ID loss uses cross-entropy loss to train the network, and the formula is as follows:

$$L_{id} = \Sigma_{i=1}^{N} -q_i \log(p_i) \quad (7)$$

N is the number of pedestrian categories, $q_i$ is the supervised label, and $p_i$ is the predicted label.

Difficult triplet loss randomly samples P identities, and extracts K instances from each share to form a mini batch of size P*K; selects each picture $x_a$ in the batch as an anchor point in turn, and selects the farthest positive sample picture $x_p$ and the nearest negative sample picture $x_n$ in the batch to form a triplet to train the network and enhance the generalization ability of the network. The formula is:

$$L_{triplet} = \sum_{i=1}^{P}\sum_{a=1}^{K}\left[m + \underbrace{\max_{1 \le p \le K}\|f(x_{i,a}) - f(x_{i,p})\|_2}_{\text{hardest positive}} - \underbrace{\min_{\substack{n=1 \ldots K \\ j=1 \ldots P \\ j \ne i}}\|f(x_{i,a}) - f(x_{j,n})\|_2}_{\text{hardest negative}}\right]_+ \quad (8)$$

Step 5-2: According to the features extracted in step (4), the overall loss function of the ReID model uses the global features and local features to calculate $L_{id}$ and $L_{triplet}$ to train the network, which can be formulated as follows:

$$\text{Loss} = L_{id}(f_{cls}) + L_{triplet}(f_{cls}) + \frac{1}{k}\sum_{i=1}^{k}(L_{id}(f_i) + L_{triplet}(f_i)) \quad (9)$$

k represents the number of output feature groups.

Step 5-3: When the model is stable, get the final ReID model, input the image to be queried and the test set image into the final ReID model for feature extraction, compare whether the features of the query image and the test set image belong to the same category, and output pedestrian images of the same type.

What is claimed is:

1. A Transformer-based multi-scale pedestrian re-identification method, comprising the following steps:
   step 1: introducing a feature cascading branch in a residual network ResNet50, and performing feature fusion on feature maps of different scales in adjacent layers;
   step 2: segmenting the feature maps of different scales after fusion in step 1, and then adding a learnable SCALE_TOKEN to each segmented feature group to represent different scales, flattening the sub-graphs divided by different scales, adding POS_TOKEN representing position to obtain feature sub-graph vectors, and the feature sub-graph vectors and a global feature CLS_TOKEN vector are input of the transformer;
   step 3: constructing a pedestrian feature extraction network based on a standard Transformer, and inputting the feature sub-graph vectors obtained in step 2 into the network to obtain pedestrian features;
   step 4: splitting the pedestrian features obtained in step 3, using the CLS_TOKEN vector as the global feature, while local features with different scales are input into a local feature multi-scale fusion module and re-sliced to obtain final features comprising multi-scale fusion vectors;
   step 4-1: after obtaining the output feature $Z_L$ of the Transformer model, dividing the feature Z to obtain four sets of feature vectors representing the global feature $f_{cls}$ and three features $f_{scale\_1}$, $f_{scale\_2}$ and $f_{scale\_3}$ of different scales;
   performing double linear interpolation to the features of different scales, and then performing feature fusion through 1*1 convolution to obtain the final local feature $f_{final}$; then, according to a pedestrian structure, dividing the final local feature $f_{final}$ into four local features $f_1$, $f_2$, $f_3$, and $f_4$;
   step 5: using the CLS_TOKEN vector and the multi-scale fusion vectors obtained in step 4 to train according to a training strategy to obtain a final ReID model;
   step 5-1: using labeled data in a pedestrian re-identification dataset as supervision information, and using ID loss and difficult triplet loss to train the network for each training batch, wherein the ID loss uses cross-entropy loss to train the network, and the formula is as follows:

$$L_{id} = \Sigma_{i=1}^{N} -q_i \log(p_i) \quad (6)$$

wherein N is a number of pedestrian categories, $q_i$ is the supervised label, and $p_i$ is the predicted label, and
   using the difficult triplet loss to train the network comprises:
   difficult triplet loss randomly sampling P identities, and extracting K instances from each share to form a mini batch of size P*K, selecting each picture $x_a$ in the batch as an anchor point in turn, and selecting the farthest positive sample picture $x_p$ and the nearest negative sample picture $x_n$ in the batch to form a triplet to train the network and enhance the generalization ability of the network, which can be formulated as formula (7):

$$L_{triplet} = \sum_{i=1}^{P}\sum_{a=1}^{K}\left[m + \underbrace{\max_{1 \le p \le K}\|f(x_{i,a}) - f(x_{i,p})\|_2}_{\text{hardest positive}} - \underbrace{\min_{\substack{n=1 \ldots K \\ j=1 \ldots P \\ j \ne i}}\|f(x_{i,a}) - f(x_{j,n})\|_2}_{\text{hardest negative}}\right]_+ \quad (7)$$

step 5-2: according to the features extracted in step 4, the overall loss function of the ReID model uses the global features and local features to calculate $L_{id}$ and $L_{triplet}$ to train the network, which can be formulated as formula (8):

$$\text{Loss} = L_{id}(f_{cls}) + L_{triplet}(f_{cls}) + \frac{1}{k}\sum_{i=1}^{k}(L_{id}(f_i) + L_{triplet}(f_i)) \quad (8)$$

step 5-3: obtaining the final ReID model when the ReID model is stable;
   step 6: inputting queried images and test set images into the final ReID model for feature extraction, comparing whether the features of the queried images and the test set images belong to the same category, associating pedestrian images that belong to the same category, and outputting the pedestrian images for cross-camera and cross-scenario pedestrian recognition and retrieval; wherein the pedestrian images are captured by different cameras.

2. The Transformer-based multi-scale pedestrian re-identification method according to claim 1, wherein the step 1 comprises sub-steps of step 1-1 to step 1-2:
   step 1-1: utilizing ResNet50 pre-trained on ImageNet as a backbone network, retaining the first pooling stage and the first three stages of the backbone network, while removing the final stage, spatial downsampling operations, global average pooling layer, and fully connected layer;
   step 1-2: obtaining feature information of a total of 4 stages retained in step 1-1 from the ResNet50, constructing a multi-scale feature cascade module, and obtaining pedestrian feature information through pairwise fusion between adjacent layers, wherein step 1-2 comprises:
   upsampling and performing 1×1 convolution on features obtained from Stage 1, increasing the size of the feature maps to twice their original size;
   performing the feature fusion between the features from Stage 1 and Stage 2, Stage 2 and Stage 3, and Stage 3 and Stage 4, wherein fusion feature obtained is expressed according to formula (1) and formula (2):

$$F_{sc}=\text{Contact}(\text{UpSample}(F_s),F_b) \quad (1)$$

$$F_{agg}=\text{conv}_{1\times1}(F_{sc}) \quad (2)$$

wherein $F_s$, $F_b$ respectively represent two features that need to be fused, UpSample represents the upsampling operation, Contact is the vector connection operation, $F_{agg}$ is the obtained fusion feature.

3. The Transformer-based multi-scale pedestrian re-identification method according to claim 2, wherein the step 2 comprises sub-step of step 2-1:
   step 2-1: dividing the obtained fusion feature $F_{agg}$ according to the sub-feature map size ps to generate a feature map sequence $x_p=\{F_{agg}{}^i=1,2,\ldots N\}$, wherein N is the number of splits, and then adding the learnable SCALE_TOKEN to $x_p$, wherein SCALE_TOKEN has the same dimension size as $x_p$, as shown in formula (3):

$$x_p^k=x_p+E_{scale} \quad (3)$$

wherein $x_p^k$ is the sequence of feature maps generated at the k-th scale; $E_{scale}$ is SCALE_TOKEN, indicating the learnable feature scale;
   adding CLS_TOKEN and POS_TOKEN to the feature processing of the three scales obtained in step 1-2 to obtain feature Z, as shown in formula (9):

$$Z=[x_{cls};x_p^1;x_p^2;x_p^3]+E_{pos} \quad (9)$$

wherein $x_{cls}$ is the global feature vector of CLS_TOKEN; $x_p^1$, $x_p^2$, and $x_p^3$ are feature sequences of three scales respectively; $E_{pos}$ is POS_TOKEN, indicating the spatial position.

4. The Transformer-based multi-scale pedestrian re-identification method according to claim 3, wherein the step 3 comprises sub-step of step 3-1:
   step 3-1: constructing a multi-scale feature extraction model for pedestrians based on Transformer to fully utilize the multi-scale information, wherein the multi-scale feature extraction model comprises multi-layer stacked Transformer blocks, and a single Transformer layer is composed of a multi-head attention mechanism MSA, a layer normalization LN and a multi-layer perceptron MLP, a single Transformer block can be formulated as (4) and (5):

$$Z'_l=MSA(LN(Z_{l-1}))+Z_{l-1} \quad l=1\ldots L \quad (4)$$

$$Z_l=MLP(LN(Z'_l))+Z'_l \quad l=1\ldots L \quad (5)$$

wherein $Z_l$ represents the output feature of the l-th layer Transformer block, $Z'_l$ is the intermediate result in the Transformer block, and L is the total number of layers; the multi-scale feature Z generated by each image are used as the input of the Transformer network, the network output result is the output feature of the last layer.

* * * * *